UNITED STATES PATENT OFFICE.

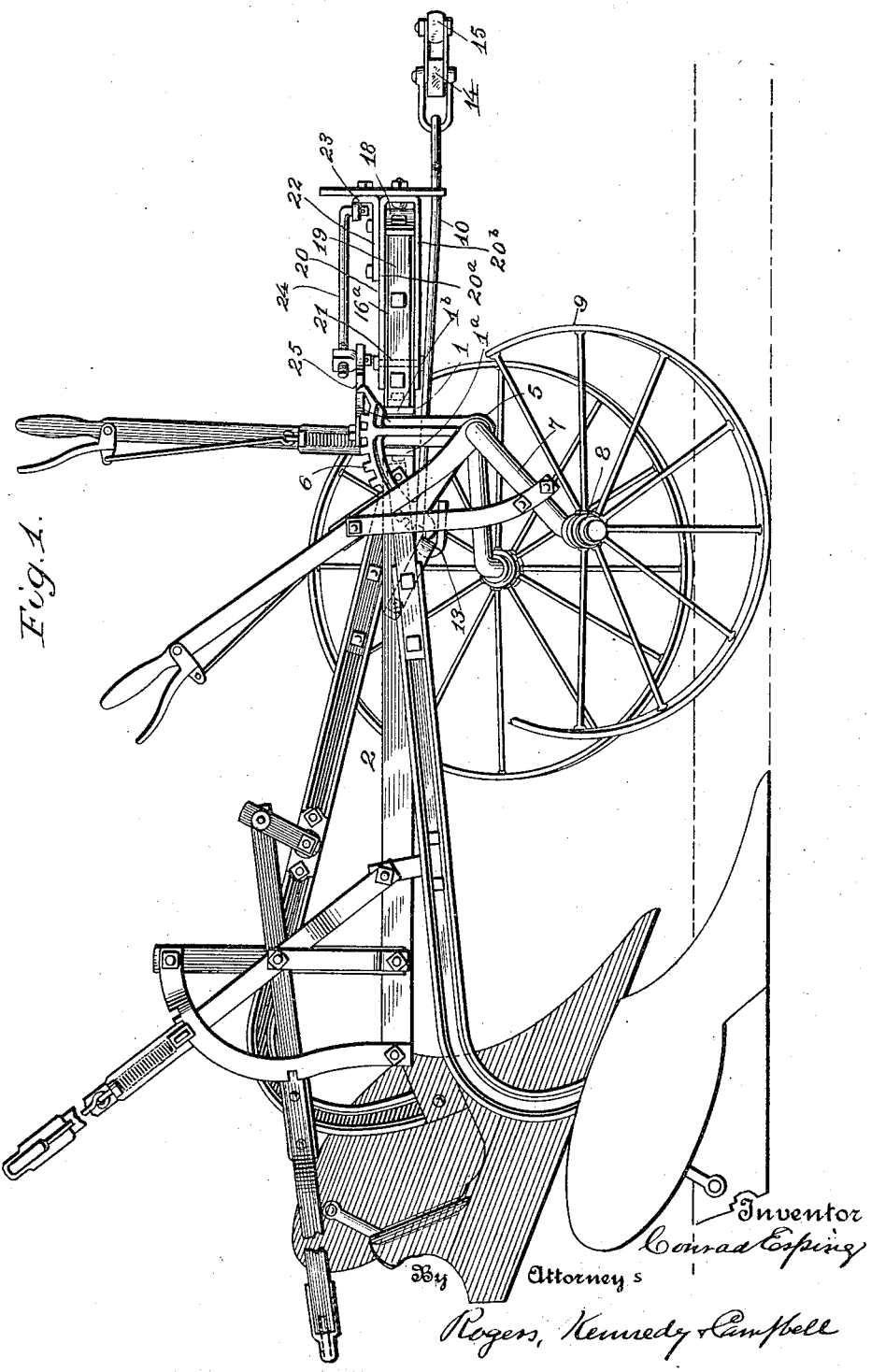

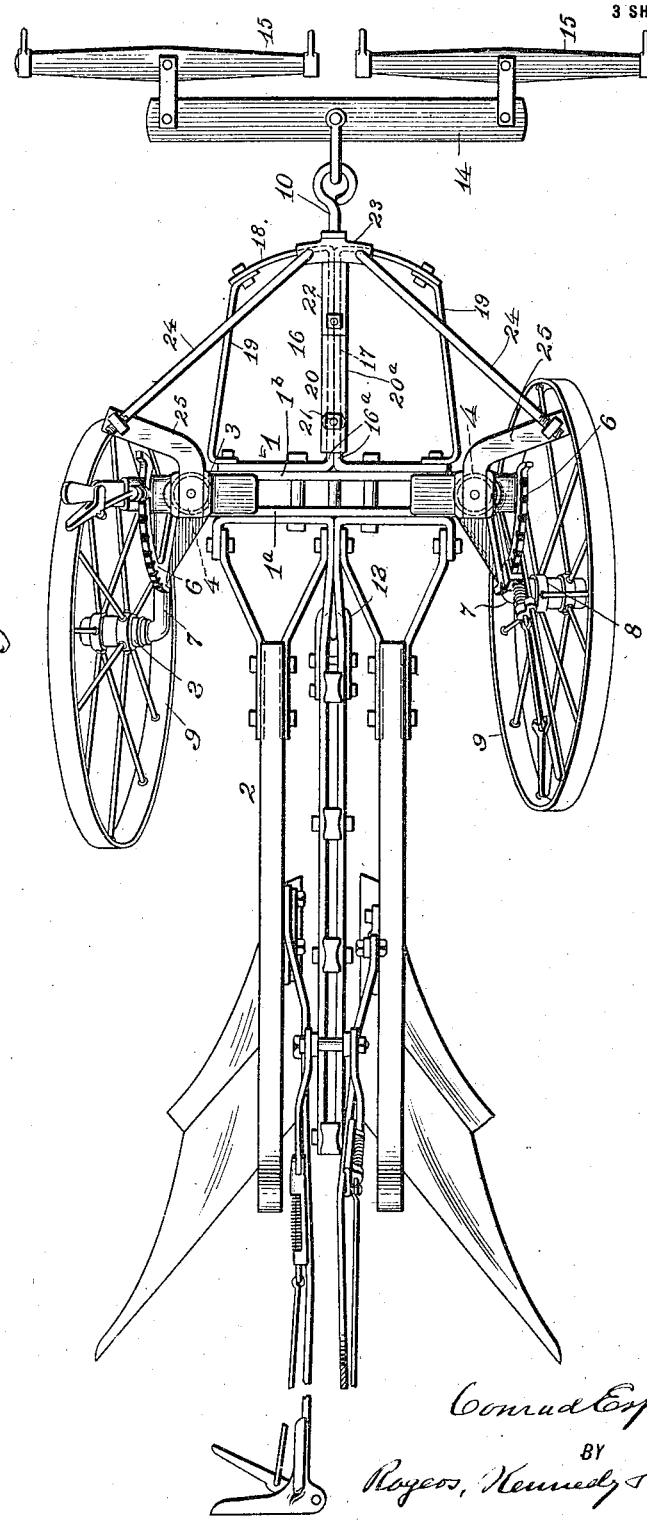

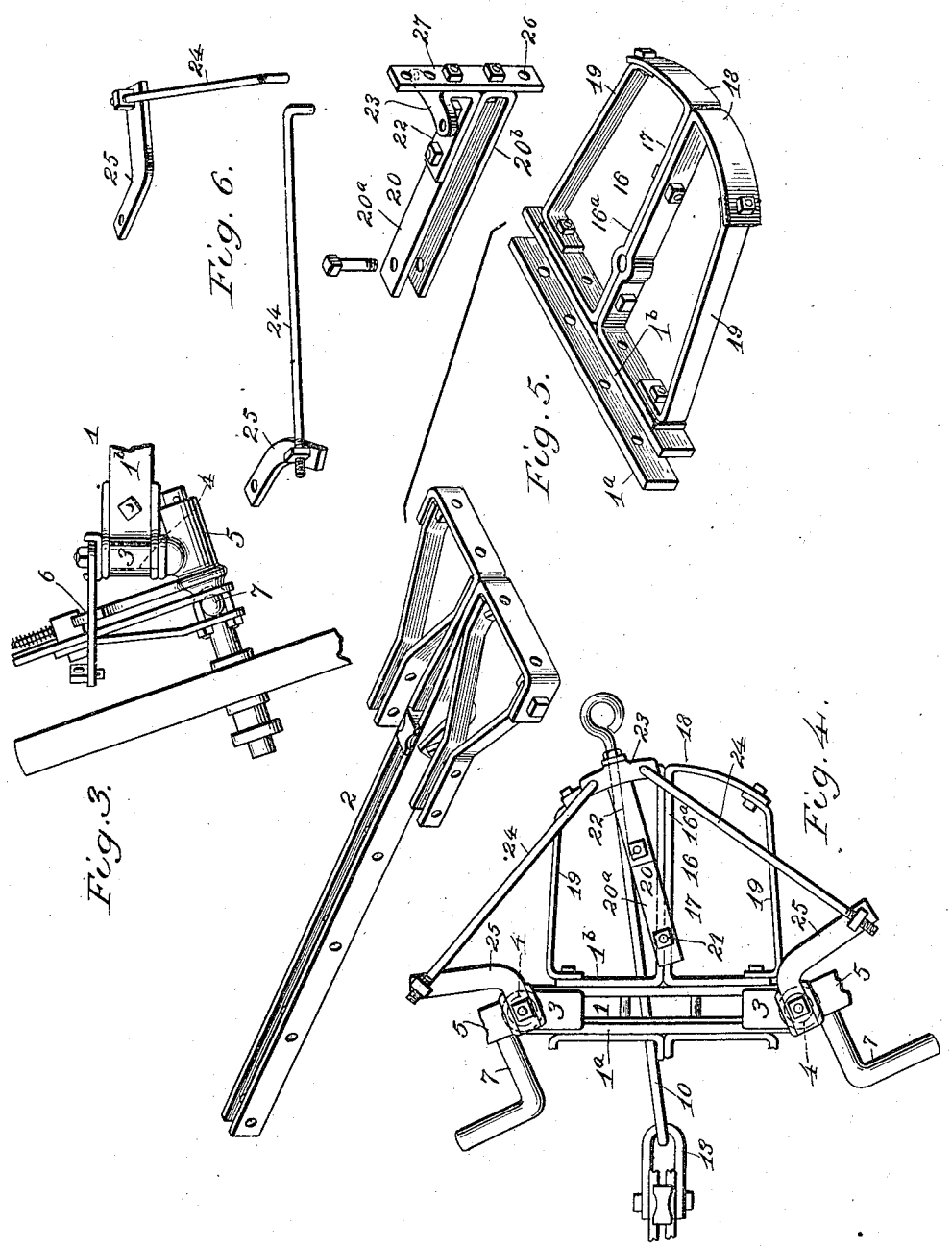

CONRAD ESPING, OF MOLINE, ILLINOIS, ASSIGNOR TO MOLINE PLOW COMPANY, A CORPORATION OF ILLINOIS.

GUIDING MECHANISM FOR AGRICULTURAL IMPLEMENTS.

1,250,156.      Specification of Letters Patent.      Patented Dec. 18, 1917.

Original application filed August 15, 1916, Serial No. 114,954. Divided and this application filed January 3, 1917. Serial No. 140,369.

*To all whom it may concern:*

Be it known that I, CONRAD ESPING, a citizen of the United States, residing at Moline, in the county of Rock Island and State of Illinois, have invented certain new and useful Improvements in Guiding Mechanism for Agricultural Implements, of which the following is a specification, reference being had therein to the accompanying drawing.

This invention relates to agricultural implements such as wheeled plows, wheeled cultivators, wheeled harrows and the like, in which the frame of the machine is sustained by carrying wheels and is drawn through the field by draft animals.

The aim of the invention is to provide for the effective and accurate guiding of the machine by the draft animals, more particularly in turning at corners and in turning at the ends of the furrows or rows.

With this aim in view, my invention consists in mounting the carrying wheels on the frame so that they may be turned or swiveled about vertical axes, and in combining with said wheels, controlling mechanism of improved form and construction adapted to be shifted by the draft animals as the latter turn to the right or left, and to thus correspondingly shift or turn the carrying wheels in unison on their vertical axes, and in this manner effect the guiding of the machine.

In the accompanying drawings I have illustrated my invention as applied, by way of example, to a two-way plow comprising a frame giving support to moldboard plows pointing in the same direction but facing in opposite directions, and adapted to be alternately raised and lowered for alternate action to throw all the furrows in the same direction, as the machine travels back and forth through the field, the said frame being supported at its front by two swiveling carrying wheels arranged at opposite sides thereof and movable up and down alternately to act respectively as land and furrow wheels. It will be manifest, however, that the invention is not limited in its application to machines of this type, but is applicable as well to other types of plows, and to wheeled harrows, wheeled cultivators and like machines.

In the accompanying drawings:

Figure 1 is a side elevation of a wheeled plow having my invention applied thereto.

Fig. 2 is a top plan view of the same.

Fig. 3 is a front elevation of one of the carrying wheels showing how it is swiveled in the frame.

Fig. 4 is a plan view of the front portion of the machine showing how the plow is turned and guided by the draft team.

Fig. 5 is a perspective view of certain portions of the machine frame separated from each other.

Fig. 6 is a perspective view of details of the plow guiding means.

Referring to the drawings:

The frame of the machine comprises generally a front transverse frame member 1 comprising two horizontal spaced frame bars 1ª and 1ᵇ connected together in the form of a unitary structure, and a central rearwardly extending frame member 2 connected as its forward end with the transverse frame member so as to constitute in effect a single, rigid unitary frame structure which gives support to two plow beams as shown.

The transverse frame member 1 gives support at its opposite ends to blocks or castings 3 provided with vertical bearing openings in which are mounted vertical journals 4 extending upwardly from inclined sleeves 5 carrying at their outer ends upright segment frames 6, the arrangement being such that these segment frames may swivel or turn in the bearing openings in the blocks, about the vertical axes of the journals. Crank axles 7 have their inner ends mounted to rock in horizontal bearing openings in the sleeves and are formed on their outer ends with horizontal wheel journals 8 on which the carrying wheels 9 are respectively mounted, the bearing openings in the sleeves 5 being inclined downwardly in order to give the wheels a stagger or set to act as furrow wheels. As a result of this construction the wheels are adapted to swivel about the vertical axes of the journals 4 in the guiding movements of the machine at the ends of the furrows, such swiveling movements being controlled by the draft team in the manner now to be described.

The draft is applied to the machine by means of a fore and aft extending draft rod 10, having its rear end engaged with a draft strap 13 connected with the central frame member near its forward end. At its front end the rod is adapted to have connected with it a double-tree 14, carrying the usual swingle-trees 15, to which the draft animals are hitched. The connection of the rear end of the draft rod with the strap is such that said rod will be swung to the right and left about a vertical axis as the draft team turns in the corresponding directions, and in order that the carrying wheels may be likewise turned by the team to guide the machine, I provide suitable connecting means of novel form between the draft rod and carrying wheels, which will operate to turn the carrying wheels automatically about the vertical axes of the journals as the draft rod is shifted horizontally by the team. To effect this action of the parts a horizontal frame 16 is fixed to and extends forwardly from the transverse frame member 1. This frame 16 is formed by means of two plates 16ª extending in a fore and aft direction and firmly connected to each other so as to form a rigid central supporting member 17. At their rear ends these plates are extended outwardly in opposite directions and are firmly bolted or otherwise secured to the front frame member 1ᵇ. At their forward ends the plates 16ª are curved outwardly in opposite directions so as to constitute a segmental or arcuate supporting member 18 on the front of the frame 16, the outwardly extending front and rear ends of the plate 16ª being firmly connected together by means of fore and aft extending brace straps 19, all as shown more particularly in Figs. 2 and 5. Supported on the front curved member 18 of the frame 16 is a swinging member 20, which consists of a U-shaped frame with upper and lower arms 20ª and 20ᵇ. The frame 16 is embraced between these arms, which latter are pivoted to the fixed central supporting member 17 by means of a vertical pivot bolt 21 extending through the rear ends of the arms and through said supporting member. As a result of this construction, the U-shaped frame may be swung horizontally about the axis of the pivot bolt and in such movements it will be supported by the forward curved guiding portions 18 of the frame 16. A bracket 22 is fixed to the upper arm 20ª at its forward end, which bracket is provided with oppositely extending arms 23. These arms have jointed to them the forward ends of links 24, which extend rearwardly and outwardly and have their rear ends jointed to the outer ends of arms 25, which latter arms extend inwardly and are fixedly connected with the upper ends of the respective journals 4. As a result of this construction and arrangement of the parts, the lateral swinging movement of the U-shaped frame 20 will turn the arms 25 in the same direction, which action will turn the journals 4 in their bearings in the machine frame and will correspondingly swing the carrying wheels 9 on their vertical axes.

The draft rod 10 extends at its forward end through a horizontal opening 26 in a vertical plate 27 fixed to the forward end of the U-shaped frame 20 so that the horizontal swinging movement of the draft rod as the team turns in either direction, will be transmitted to the swinging U-shaped frame, and these movements will in turn be transmitted to the carrying wheels, causing them to swivel and guide the machine.

This guiding action of the parts is shown more particularly in Fig. 4, where it will be seen that the draft team has turned to the left and has correspondingly swung the draft rod in a like direction, which action has in like manner, swung the U-shaped frame, and through the medium of links 24 and arms 25, the two carrying wheels have been turned in the same direction relatively to the machine frame. When the team turns in the opposite direction to guide the machine to the right, the foregoing actions are repeated but in reverse direction. It is seen, therefore, that by the turning of the draft team to the right or left, both carrying wheels are simultaneously turned to guide the machine in corresponding direction, thereby effecting the prompt and short turn of the machine.

In the foregoing description and accompanying drawings I have set forth my invention in the particular detailed form which I prefer to adopt and which in practice has been found to answer to a satisfactory degree the ends to be attained. It will be manifest, however, that these details may be variously changed and modified without departing from the limits of my invention, and further it will be understood that the invention is not limited to any particular form or construction of the parts except in so far as such limitations are specified in the claims.

Having thus described my invention, what I claim is:

1. In an agricultural implement, the combination of a frame provided with a forwardly extending portion, wheel supports mounted on the frame at opposite sides to turn about upright axes, carrying wheels mounted on said supports, a member mounted on said frame to swing horizontally at its front, said forwardly extending portion of the frame coöperating with the forward portion of the swinging member in sustaining the same against sagging, operative connections between the swinging member and the wheel supports to turn the latter about their upright axes, and a horizontally swinging draft device connected with the frame and engaging said swinging member to swing the same.

2. In an agricultural implement, the combination of a frame provided with a forwardly extending frame member having a front supporting portion, wheel supports mounted on the opposite sides of the frame to turn about upright axes, carrying wheels mounted on said supports, a horizontally swinging member pivoted to the forwardly extending frame member on an upright axis and supported in its swinging movements by the supporting portion of said frame member, operative connections between said swinging member and the wheel supports to turn the latter on their axes, said swinging member being provided with a horizontal opening; and a horizontally swinging draft rod connected with the frame and extending through said opening in the swinging member.

3. In an agricultural implement, the combination of a frame, wheel supports mounted at opposite sides thereof to turn about upright axes, carrying wheels mounted on said supports, a horizontally movable member pivoted to the frame to swing about a vertical axis, operative connections between the wheel supports and said member to turn the supports on their axes, a fixed supporting member sustained by the frame in the advance of the axis of the swinging member and curved in an arc whose axis is coincident with the axis of the swinging member, said supporting member supporting the swinging member against sagging, and a horizontally swinging draft rod connected with the machine frame and engaging the swinging member to swing the same.

4. In an agricultural implement, the combination of a frame provided with a transverse portion and with a rigid frame member extending forwardly from said transverse portion, wheel supports mounted at the opposite ends of the transverse portion of the frame to turn about upright axes, carrying wheels mounted on said supports, a U-shaped frame embracing said rigid frame member and pivoted thereto to swing horizontally, whereby the U-shaped frame will be guided and supported in its movements by the rigid frame member, operative connections between the U-shaped frame and wheel supports to swivel the latter, and a horizontally swinging draft rod connected with the machine frame and operatively engaged with the U-shaped frame to swing the same.

In testimony whereof, I have affixed my signature.

CONRAD ESPING.

Copies of this patent may be obtained for five cents each, by addressing the "Commissioner of Patents. Washington, D. C."